US009685161B2

(12) United States Patent
Lu

(10) Patent No.: US 9,685,161 B2
(45) Date of Patent: Jun. 20, 2017

(54) METHOD FOR UPDATING VOICEPRINT FEATURE MODEL AND TERMINAL

(71) Applicant: Huawei Device Co., Ltd., Shenzhen (CN)

(72) Inventor: Ting Lu, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 150 days.

(21) Appl. No.: 14/585,486

(22) Filed: Dec. 30, 2014

(65) Prior Publication Data
US 2015/0112680 A1 Apr. 23, 2015

Related U.S. Application Data

(63) Continuation of application No. PCT/CN2013/079005, filed on Jul. 8, 2013.

(30) Foreign Application Priority Data

Jul. 9, 2012 (CN) .......................... 2012 1 0235593

(51) Int. Cl.
G10L 17/00 (2013.01)
G10L 17/04 (2013.01)
(Continued)

(52) U.S. Cl.
CPC ............ G10L 17/04 (2013.01); G10L 15/063 (2013.01); G10L 15/07 (2013.01); G10L 15/142 (2013.01);
(Continued)

(58) Field of Classification Search
CPC ......... G10L 17/02; G10L 17/00; G10L 15/24; G10L 25/51; G10L 17/005; G10L 17/06;
(Continued)

(56) References Cited

U.S. PATENT DOCUMENTS 5,659,662 A 8/1997 Wilcox et al.
5,893,059 A * 4/1999 Raman .................. G10L 15/063
704/236
(Continued)

FOREIGN PATENT DOCUMENTS

CN 1662956 A 8/2005
CN 1794315 A 6/2006
(Continued)

OTHER PUBLICATIONS

Lu, H., et al., "SpeakerSense: Energy Efficient Unobtrusive Speaker Identification on Mobile Phones," Department of Computer Science, Jun. 2011, 18 pages.
(Continued)

Primary Examiner — Vijay B Chawan
(74) Attorney, Agent, or Firm — Conley Rose, P.C.

(57) ABSTRACT

A method for updating a voiceprint feature model and a terminal are provided that are applicable to the field of voice recognition technologies. The method includes: obtaining an original audio stream including at least one speaker; obtaining a respective audio stream of each speaker of the at least one speaker in the original audio stream according to a preset speaker segmentation and clustering algorithm; separately matching the respective audio stream of each speaker of the at least one speaker with an original voiceprint feature model, to obtain a successfully matched audio stream; and using the successfully matched audio stream as an additional audio stream training sample for generating the original voiceprint feature model, and updating the original voiceprint feature model.

20 Claims, 7 Drawing Sheets

(51) Int. Cl.
  *G10L 15/14* (2006.01)
  *G10L 15/07* (2013.01)
  *G10L 15/06* (2013.01)
  *G10L 17/02* (2013.01)

(52) U.S. Cl.
  CPC ...... *G10L 17/02* (2013.01); *G10L 2015/0631* (2013.01)

(58) Field of Classification Search
  CPC ..... G10L 17/16; H04M 2201/41; H04M 3/51; H04M 3/523; H04M 2203/553; H04M 2203/554; H04M 3/385
  USPC ..... 704/246, 273, 245, 250, 244; 379/88.02, 379/88.01, 88.04
  See application file for complete search history.

(56) References Cited

U.S. PATENT DOCUMENTS

| | | | |
|---|---|---|---|
| 7,240,007 B2 * | 7/2007 | Junqua | G10L 15/24 704/246 |
| 7,739,114 B1 | 6/2010 | Chen et al. | |
| 8,635,243 B2 * | 1/2014 | Phillips | G10L 15/22 704/235 |
| 8,880,398 B1 * | 11/2014 | Aleksic | G10L 15/30 704/235 |
| 9,240,188 B2 * | 1/2016 | Paul | G10L 17/16 |
| 9,258,425 B2 * | 2/2016 | Krause | G10L 17/00 |
| 2002/0091517 A1 | 7/2002 | Frank et al. | |
| 2003/0182119 A1 * | 9/2003 | Junqua | G10L 15/24 704/246 |
| 2003/0236663 A1 | 12/2003 | Dimitrova et al. | |
| 2004/0107100 A1 | 6/2004 | Lu et al. | |
| 2008/0228482 A1 | 9/2008 | Abe | |
| 2010/0138223 A1 | 6/2010 | Koshinaka | |
| 2011/0224986 A1 | 9/2011 | Summerfield | |
| 2012/0249328 A1 | 10/2012 | Xiong | |
| 2013/0060569 A1 * | 3/2013 | Fu | G07C 9/00158 704/246 |
| 2014/0142944 A1 * | 5/2014 | Ziv | G10L 17/02 704/250 |
| 2014/0186724 A1 * | 7/2014 | Hammond | H01M 2/1646 429/405 |
| 2015/0025887 A1 * | 1/2015 | Sidi | G10L 17/16 704/245 |

FOREIGN PATENT DOCUMENTS

| | | |
|---|---|---|
| CN | 101673544 A | 3/2010 |
| CN | 101770774 A | 7/2010 |
| CN | 102074236 A | 5/2011 |
| CN | 102231277 A | 11/2011 |
| CN | 102543063 A | 7/2012 |
| CN | 102760434 A | 10/2012 |
| JP | H07287592 A | 10/1995 |
| JP | 2006017936 A | 1/2006 |
| JP | 2007233149 A | 9/2007 |
| JP | 2009109712 A | 5/2009 |
| JP | 2010054733 A | 3/2010 |

OTHER PUBLICATIONS

Foreign Communication From a Counterpart Application, Australian Application No. 2013289660, Australian Office Action dated Dec. 18, 2015, 4 pages.
Partial English Translation and Abstract of Japanese Patent Application No. JP2009109712, Jan. 13, 2016, 52 pages.
Partial English Translation and Abstract of Japanese Patent Application No. JPA2010054733, Jan. 13, 2016, 42 pages.
Partial English Translation and Abstract of Japanese Patent Application No. JPH07287592, Jan. 14, 2016, 30 pages.
Foreign Communication From a Counterpart Application, Japanese Application No. 2015-509296, Japanese Office Action dated Nov. 17, 2015, 2 pages.
Foreign Communication From a Counterpart Application, Japanese Application No. 2015-509296, English Translation of Japanese Office Action dated Nov. 17, 2015, 2 pages.
Partial English Translation and Abstract of Chinese Patent Application No. CN102543063A, Dec. 22, 2014, 4 pages.
Partial English Translation and Abstract of Chinese Patent Application No. CN102760434A, Part 1, Dec. 22, 2014, 11 pages.
Partial English Translation and Abstract of Chinese Patent Application No. CN102760434A, Part 2, Oct. 28, 2014, 3 pages.
Foreign Communication From a Counterpart Application, Chinese Application No. 201210235593.0, Chinese Office Action dated Aug. 1, 2013, 6 pages.
Foreign Communication From a Counterpart Application, PCT Application No. PCT/CN2013/079005, English Translation of International Search Report dated Oct. 17, 2013, 4 pages.
Foreign Communication From a Counterpart Application, PCT Application No. PCT/CN2013/079005, English Translation of Written Opinion dated Oct. 17, 2013, 11 pages.
Foreign Communication From a Counterpart Application, European Application No. 13816191.4, Extended Europen Search Report dated Feb. 2, 2015, 6 pages.
Foreign Communication From a Counterpart Application, Japanese Application No. 2015-509296, Japanese Notice of Allowance dated Aug. 2, 2016, 3 pages.

* cited by examiner

METHOD FOR UPDATING VOICEPRINT FEATURE MODEL AND TERMINAL

CROSS-REFERENCE TO RELATED APPLICATIONS

This application is a continuation of International Application No. PCT/CN2013/079005, filed on Jul. 8, 2013, which claims priority to Chinese Patent Application No. 201210235593.0, filed on Jul. 9, 2012, both of which are hereby incorporated by reference in their entireties.

TECHNICAL FIELD

The present invention relates to the field of voice recognition technologies, and in particular, relates to a method for updating a voiceprint feature model and a terminal.

BACKGROUND

Voiceprint recognition is a type of recognition technology implemented by using a human sound. There are some differences between vocal organs used when people are speaking, and voiceprint spectrograms of sounds of any two persons are different. Therefore, a voiceprint may be used as a biological feature that represents an individual difference. That is, different individuals may be represented by establishing a voiceprint feature model, and the voiceprint feature model is used to recognize different individuals. Currently, there is a dilemma for an application of the voiceprint feature model, which is mainly reflected in length selection of a training corpus. Generally, a longer voiceprint training corpus leads to a more precise established feature model and higher recognition accuracy, but practicability is poor; and a short voiceprint training corpus may ensure good practicability, but recognition accuracy is not high. Further, in a practical application, for example, in a screen voiceprint unlock application of a mobile phone, high recognition accuracy is required to meet security, and the training corpus should not be excessively long, so as to ensure good practicability.

In an existing voiceprint feature model establishing method, a user manually performs a plurality of times of trainings in a voiceprint registration phase, and uses a short corpus for each training, and finally combines the short corpuses into a long training corpus to generate a feature model. However, the user may have poor experience when manually recording training corpuses with a duration for a plurality of times, and the method is not highly practical; a length of the combined training corpus is still limited, a precise feature model cannot be generated, and the recognition accuracy cannot be further improved; and variations of a speaking speed and intonation and emotional fluctuation may also affect model establishing precision. Therefore, it is an urgent problem of how to improve the precision of the voiceprint feature model and further improve the recognition accuracy under a premise of relatively high practicability.

SUMMARY

A purpose of embodiments of the present invention is to provide a method for updating a voiceprint feature model and a terminal, so as to solve a problem that when a voiceprint feature model is obtained by using an existing method, it cannot be ensured that precision of the voiceprint feature model is improved under a premise of relatively high practicability, and as a result, recognition accuracy cannot be improved by using the voiceprint feature model.

According to a first aspect, the method for updating a voiceprint feature model includes: obtaining an original audio stream including at least one speaker; obtaining a respective audio stream of each speaker of the at least one speaker in the original audio stream according to a preset speaker segmentation and clustering algorithm; separately matching the respective audio stream of each speaker of the at least one speaker with an original voiceprint feature model, to obtain a successfully matched audio stream; and using the successfully matched audio stream as an additional audio stream training sample for generating the original voiceprint feature model, and updating the original voiceprint feature model.

In a first possible implementation manner of the first aspect, before the obtaining an original audio stream including at least one speaker, the method further includes establishing the original voiceprint feature model according to a preset audio stream training sample.

With reference to the first aspect or the first possible implementation manner of the first aspect, in a second possible implementation manner, the obtaining a respective audio stream of each speaker of the at least one speaker in the original audio stream according to a preset speaker segmentation and clustering algorithm includes: segmenting the original audio stream into a plurality of audio clips according to a preset speaker segmentation algorithm, where each audio clip of the plurality of audio clips includes only audio information of a same speaker of the at least one speaker; and clustering, according to a preset speaker clustering algorithm, the audio clips that include only the same speaker of the at least one speaker, to generate an audio stream that includes only the audio information of the same speaker of the at least one speaker.

With reference to the first aspect or the first possible implementation manner of the first aspect or the second possible implementation manner of the first aspect, in a third possible implementation manner, the separately matching the respective audio stream of each speaker of the at least one speaker with an original voiceprint feature model, to obtain a successfully matched audio stream includes: obtaining a matching degree between the audio stream of each speaker of the at least one speaker and the original voiceprint feature model according to the audio stream of each speaker of the at least one speaker and the original voiceprint feature model; and selecting an audio stream corresponding to a matching degree that is the highest and is greater than a preset matching threshold as the successfully matched audio stream.

With reference to the first aspect or the first possible implementation manner of the first aspect or the second possible implementation manner of the first aspect or the third possible implementation manner of the first aspect, in a fourth possible implementation manner, the using the successfully matched audio stream as an additional audio stream training sample for generating the original voiceprint feature model, and updating the original voiceprint feature model includes: generating a corrected voiceprint feature model according to the successfully matched audio stream and the preset audio stream training sample, where the preset audio stream training sample is an audio stream for generating the original voiceprint feature model; and updating the original voiceprint feature model to the corrected voiceprint feature model.

According to a second aspect, the terminal includes an original audio stream obtaining unit, a segmentation and clustering unit, a matching unit and a model updating unit, where the original audio stream obtaining unit is configured to obtain an original audio stream including at least one speaker, and send the original audio stream to the segmentation and clustering unit; the segmentation and clustering unit is configured to receive the original audio stream sent by the original audio stream obtaining unit, obtain a respective audio stream of each speaker of the at least one speaker in the original audio stream according to a preset speaker segmentation and clustering algorithm, and send the respective audio stream of each speaker of the at least one speaker to the matching unit; the matching unit is configured to receive the respective audio stream of each speaker of the at least one speaker sent by the segmentation and clustering unit, separately match the respective audio stream of each speaker of the at least one speaker with an original voiceprint feature model, to obtain a successfully matched audio stream, and send the successfully matched audio stream to the model updating unit; and the model updating unit is configured to receive the successfully matched audio stream sent by the matching unit, use the successfully matched audio stream as an additional audio stream training sample for generating the original voiceprint feature model, and update the original voiceprint feature model.

In a first possible implementation manner of the second aspect, the terminal further includes a sample obtaining unit and an original model establishing unit, where the sample obtaining unit is configured to obtain a preset audio stream training sample, and send the preset audio stream training sample to the original model establishing unit; and the original model establishing unit is configured to receive the preset audio stream training sample sent by the sample obtaining unit, and establish the original voiceprint feature model according to the preset audio stream training sample.

With reference to the second aspect or the first possible implementation manner of the second aspect, in a second possible implementation manner, the segmentation and clustering unit includes a segmentation unit and a clustering unit, where the segmentation unit is configured to segment the original audio stream into a plurality of audio clips according to a preset speaker segmentation algorithm, where each audio clip of the plurality of audio clips includes only audio information of a same speaker of the at least one speaker, and send the audio clips that include only the same speaker of the at least one speaker to the clustering unit; and the clustering unit is configured to receive the audio clips, sent by the segmentation unit, that include only the same speaker of the at least one speaker, and cluster, according to a preset speaker clustering algorithm, the audio clips that include only the same speaker of the at least one speaker, to generate an audio stream that includes only the audio information of the same speaker of the at least one speaker.

With reference to the second aspect or the first possible implementation manner of the second aspect or the second possible implementation manner of the second aspect, in a third possible implementation manner, the matching unit includes a matching degree obtaining unit and a matched audio stream obtaining unit, where the matching degree obtaining unit is configured to obtain a matching degree between the audio stream of each speaker of the at least one speaker and the original voiceprint feature model according to the audio stream of each speaker of the at least one speaker and the original voiceprint feature model, and send the matching degree to the matched audio stream obtaining unit; and the matched audio stream obtaining unit is configured to receive the matching degree, sent by the matching degree obtaining unit, between the audio stream of each speaker of the at least one speaker and the original voiceprint feature model, and select an audio stream corresponding to a matching degree that is the highest and is greater than a preset matching threshold as the successfully matched audio stream.

With reference to the second aspect or the first possible implementation manner of the second aspect or the second possible implementation manner of the second aspect or the third possible implementation manner of the second aspect, in a fourth possible implementation manner, the model updating unit includes a corrected model obtaining unit and a model updating subunit, where the corrected model obtaining unit is configured to generate a corrected voiceprint feature model according to the successfully matched audio stream and the preset audio stream training sample, and send the corrected voiceprint feature model to the model updating subunit; and the model updating subunit is configured to receive the corrected voiceprint feature model sent by the corrected model obtaining unit, and update the original voiceprint feature model to the corrected voiceprint feature model.

In the embodiments of the present invention, an original audio stream including at least one speaker is obtained, a respective audio stream of each speaker of the at least one speaker in the original audio stream is obtained according to a preset speaker segmentation and clustering algorithm, the audio stream of each speaker of the at least one speaker is separately matched with an original voiceprint feature model, to obtain a successfully matched audio stream, and the successfully matched audio stream is used as an additional audio stream training sample for generating the original voiceprint feature model, so as to update the original voiceprint feature model. This solves a problem that when a voiceprint feature model is obtained by using an existing method, it cannot be ensured that precision of the voiceprint feature model is improved under a premise of relatively high practicability, and as a result, recognition accuracy cannot be improved by using the voiceprint feature model, and this improves the precision of the voiceprint feature model and the recognition accuracy.

DETAILED DESCRIPTION

To make the objectives, technical solutions, and advantages of the present invention clearer and more comprehensible, the following further describes the present invention in detail with reference to the accompanying drawings and embodiments. It should be understood that the specific embodiments described herein are merely used to explain the present invention but are not intended to limit the present invention.

In embodiments of the present invention, an original audio stream of at least one speaker is obtained, a respective audio stream of each speaker of the at least one speaker in the original audio stream is obtained according to a preset speaker segmentation and clustering algorithm, an audio stream matching an original voiceprint feature model is obtained, and the matched audio stream is used as an additional audio stream training sample for generating the original voiceprint feature model, so as to update the original voiceprint feature model, so that precision of the voiceprint feature model is improved and user experience is enhanced.

The following describes specific implementation of the present invention in detail with reference to specific embodiments:

Embodiment 1

Figure 1:
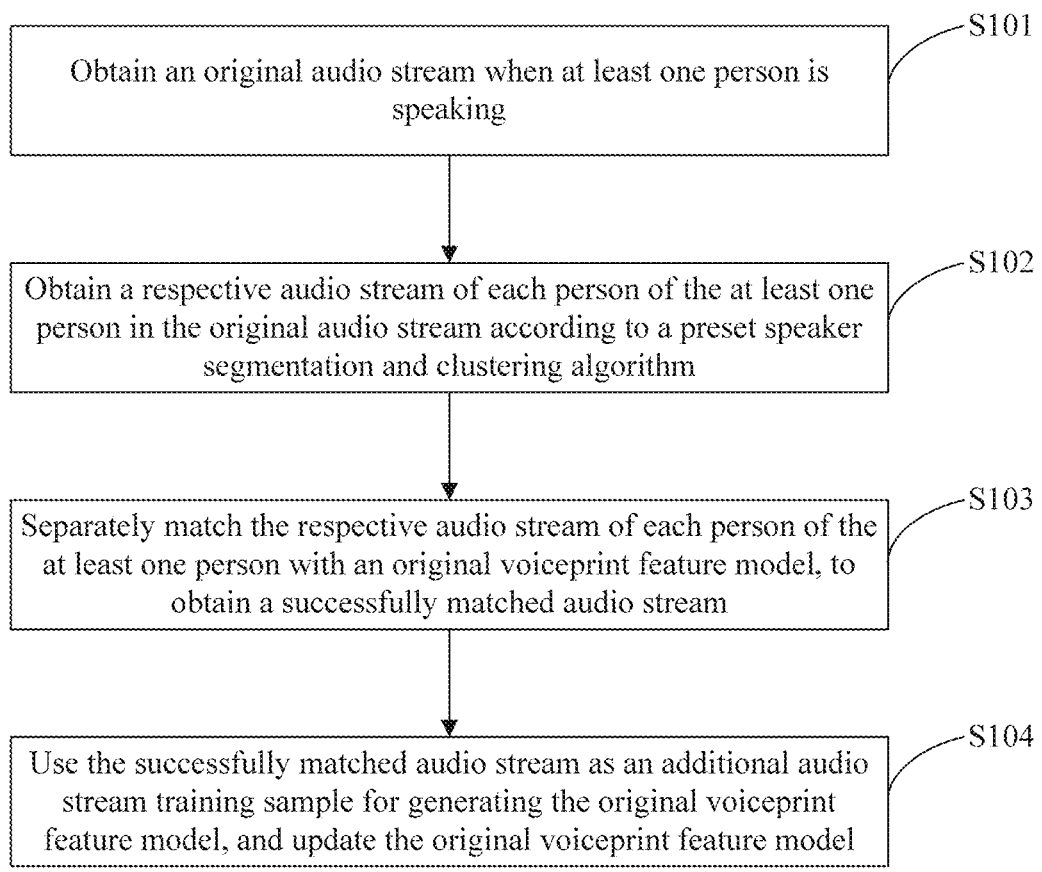
FIG. 1 is a flowchart of implementing a method for updating a voiceprint feature model according to Embodiment 1 of the present invention.

FIG. 1 shows a process of implementing a method for updating a voiceprint feature model according to Embodiment 1 of the present invention, and details are described as follows:

Step S101: Obtain an original audio stream including at least one speaker.

The original audio stream may be an audio stream generated by a user making a call or making a voice chat by using a mobile terminal, or may be an audio stream obtained, for example, in a manner of recording a voice. Specifically, a possible situation is that, when a mobile terminal user is in a call connected state, the user is asked whether to agree to use a voiceprint learning function, and an audio stream generated during a conversation is recorded if the user agrees; or a switch for automatically enabling the voiceprint learning function is configured for the terminal during a call, and the user sets the switch as required; or the voiceprint learning function is configured for the terminal, and the user may record an audio stream. It should be noted that, because usually a plurality of persons may join a conversation in turn during a phone call or a chat, the original audio stream obtained in this case may include audio data of the plurality of persons.

Step S102: Obtain a respective audio stream of each speaker of the at least one speaker in the original audio stream according to a preset speaker segmentation and clustering algorithm.

Specifically, because the original audio stream includes the audio stream of at least one speaker, it is necessary to segment the original audio stream into a plurality of audio clips according to a preset speaker segmentation algorithm, where each audio clip of the plurality of audio clips includes only audio information of a same speaker of the at least one speaker. Then, the audio clips that include only the same speaker of the at least one speaker are clustered according to a preset speaker clustering algorithm To finally generate an audio stream that includes only the audio information of the same speaker of the at least one speaker.

Step S103: Separately match the respective audio stream of each speaker of the at least one speaker with an original voiceprint feature model, to obtain a successfully matched audio stream.

The original voiceprint feature model is a voiceprint feature model established in advance according to a preset audio stream training sample. The original voiceprint feature model is a feature model that is formed after a voiceprint registration process for a person or a plurality of persons, and the registration process has no requirement on a length of a training corpus, which is also referred to as an audio stream training sample. In this case, the successfully matched audio stream may be selected according to a matching degree between the audio stream of each speaker of the at least one speaker and the original voiceprint feature model.

Step S104: Use the successfully matched audio stream as an additional audio stream training sample for generating the original voiceprint feature model, and update the original voiceprint feature model.

Specifically, after the successfully matched audio stream is obtained, the successfully matched audio stream and the preset audio stream training sample are used as a basis, where the preset audio stream training sample is a sample for generating the foregoing original voiceprint feature model. Then, a voiceprint registration algorithm interface is called, and a corrected voiceprint feature model is generated, where the corrected voiceprint feature model is a more precise voiceprint feature model, thereby achieving a purpose of model adaptation and intelligence.

Optionally, in a situation in which the audio stream of each speaker of the at least one speaker cannot match the original voiceprint feature model, a voiceprint feature model may be newly established and recorded according to pre-settings of the user. For example, for a terminal that is used for the first time, an original voiceprint feature model is null, and there is no audio stream used for matching. In this case, an audio stream of a speaker is recognized according to settings of the user, the voiceprint registration algorithm interface is called to newly establish a voiceprint feature model, and the original voiceprint feature model is updated to the newly established voiceprint feature model.

In this embodiment of the present invention, an original audio stream of at least one speaker is obtained, a respective audio stream of each speaker of the at least one speaker in the original audio stream is obtained according to a preset speaker segmentation and clustering algorithm, an audio stream matching an original voiceprint feature model is obtained, the matched audio stream is used as an additional audio stream training sample for generating the original voiceprint feature model, and the original voiceprint feature model is updated, thereby achieving a purpose of continuously correcting and updating the voiceprint feature model, continuously improving precision of the voiceprint feature model, enhancing user experience, and the like.

Embodiment 2

Figure 2:
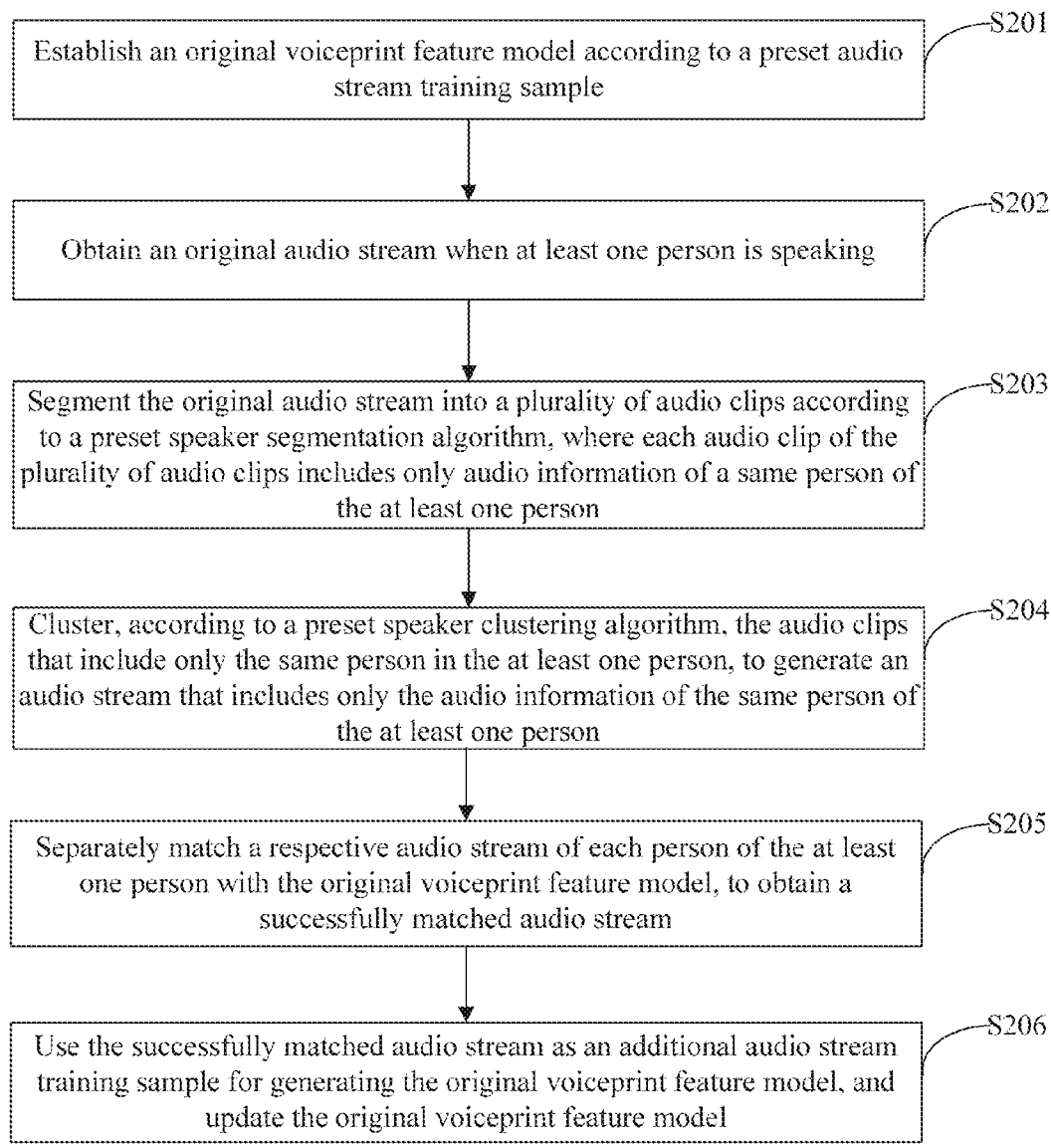
FIG. 2 is a flowchart of implementing a method for updating a voiceprint feature model according to Embodiment 2 of the present invention.

FIG. 2 shows a process of implementing a method for updating a voiceprint feature model according to Embodiment 2 of the present invention, and details are described as follows.

Step S201: Establish an original voiceprint feature model according to a preset audio stream training sample.

The original voiceprint feature model is a voiceprint feature model established according to the preset audio stream training sample by calling a voiceprint registration algorithm interface. The original voiceprint feature model is a feature model that is formed after a voiceprint registration process for a person or a plurality of persons, and the registration process has no requirement on a length of a training corpus, which is also referred to as an audio stream training sample. In addition, because the method provided by this embodiment of the present invention may implement continuous and dynamic correction for the corrected model, the original voiceprint feature model may be a model obtained by using an existing method, and may also be a model corrected by using the method provided by this embodiment of the present invention.

Step S202: Obtain an original audio stream including at least one speaker.

In a specific implementation process, the original audio stream may be an audio stream generated by a user making a call or making voice chat by using a mobile terminal, or an audio stream obtained in a manner of recording a voice. Specifically, a possible situation is that, when a mobile terminal user is in a call connected state, the user is asked whether to agree to use a voiceprint learning function, and after the user agrees, an audio stream generated during a conversation is recorded; or a switch for automatically enabling the voiceprint learning function during a call is configured for the terminal, and the user sets the switch as required; or the voiceprint learning function is configured for the terminal, and the user may record an audio stream. It should be noted that, because usually a plurality of persons may join a conversation in turn during a phone call or a chat, the original audio stream obtained in this case may include audio data of the plurality of persons.

Further, because a greatly varied speaking speed, intonation, and emotional fluctuation may generally occur during a process that the user is speaking or a process of a multi-person conversation and the like, corpuses during a call are continuously collected to eliminate deviation caused by factors of intonation, speaking speed, and emotion of the user for precision of the voiceprint feature model, which significantly reduces an effect of the factors of intonation, speaking speed, and emotion on the precision of the voiceprint feature model, and can also decrease impact on voiceprint recognition accuracy.

Step S203: Segment the original audio stream into a plurality of audio clips according to a preset speaker segmentation algorithm, where each audio clip of the plurality of audio clips includes only audio information of a same speaker of the at least one speaker.

Step S204: Cluster, according to a preset speaker clustering algorithm, the audio clips that include only the same speaker of the at least one speaker, to generate an audio stream that includes only the audio information of the same speaker of the at least one speaker.

Figure 3:
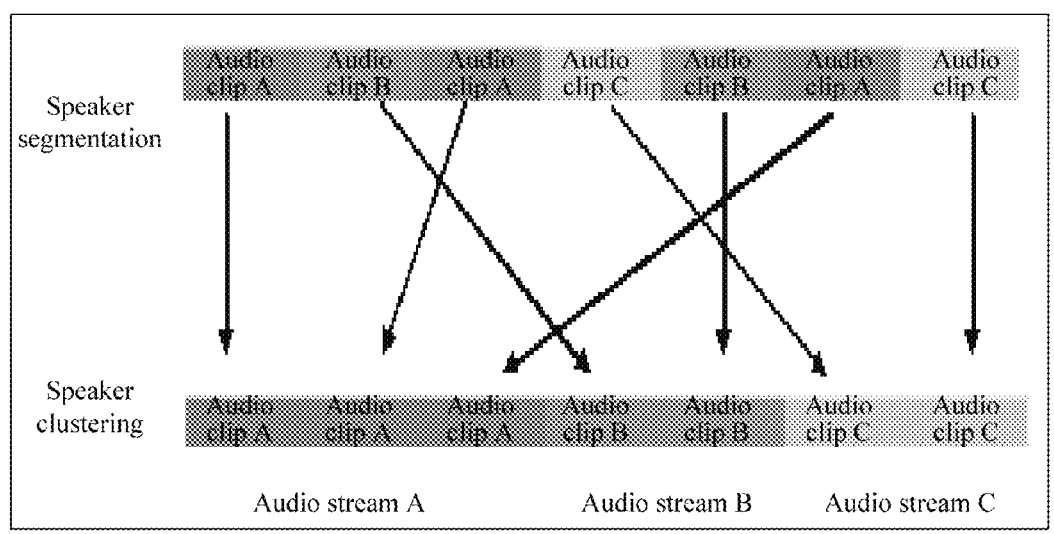
FIG. 3 is a schematic diagram of segmentation and clustering of an original audio stream according to an embodiment of the present invention.

Specifically, using the multi-person conversation as an example, it is assumed that the persons joining the conversion are a user A, a user B, and a user C. After the user agrees to record a voice, a recording module may be enabled, and an original audio stream during the call is recorded after the call is finished or a recording duration expires. The original audio stream may be segmented into a plurality of audio clips according to the preset speaker segmentation algorithm, where each audio clip includes only audio information of one speaker. As shown in FIG. 3, after the original audio stream is segmented, the obtained audio clips are an audio clip A, an audio clip B, an audio clip A, an audio clip C, an audio clip A, an audio clip C; and the audio clip A, audio clip B, and audio clip C are different clips that are of the users A, B, and C, respectively, and obtained according to a speaking time sequence. Then, the audio clips of the same speaker are clustered by using the preset speaker clustering algorithm, to generate a file of an audio stream A, a file of an audio stream B, and a file of an audio stream C. For example, the audio stream A includes all audio clips of the user A. Therefore, audio streams of different persons can be distinguished, and a valid audio stream of a same person can be extracted. The speaker segmentation algorithm and clustering algorithm may be any one existing speaker segmentation algorithm and clustering algorithm, respectively, and are not limited herein.

Step S205: Separately match a respective audio stream of each speaker of the at least one speaker with the original voiceprint feature model, to obtain a successfully matched audio stream.

Step S205 includes: obtaining a matching degree between the audio stream of each speaker of the at least one speaker and the original voiceprint feature model according to the audio stream of each speaker of the at least one speaker and the original voiceprint feature model; and selecting an audio stream corresponding to a matching degree that is the highest and is greater than a preset matching threshold as the successfully matched audio stream.

Specifically, a voiceprint verification algorithm interface is called, to separately obtain a matching degree A, a matching degree B, and a matching degree C. between the audio stream A, the audio stream B, and the audio stream C and the original voiceprint feature model. A calculating manner of the matching degrees may be using the audio stream A, the audio stream B, and the audio stream C, respectively, as an input value of the original voiceprint feature model, and obtaining the matching degree A, the matching degree B, and the matching degree C. of the audio stream A, the audio stream B, and the audio stream C, respectively, corresponding to the original voiceprint feature model, where the matching degree A, the matching degree B, and the matching degree C. are also referred to as a corresponding probability A, probability B, and probability C, respectively. For example, the matching degree A indicates relevancy between the audio stream A and the original feature model. It is assumed that the original voiceprint feature model is established based on an audio stream training sample of the user A, the matching degree A is greater than the matching threshold under a normal condition, and the matching degree B and the matching degree C. should be less than the matching threshold under a normal condition, where the preset threshold may be obtained according to an actual test result, may be preset, or may be user-defined. Therefore, in this case, the audio stream corresponding to the matching degree greater than the preset threshold is obtained, namely, the audio stream A is the successfully matched audio stream. In a special case, when sounds of A and B are very alike, there may be more than one audio stream greater than the matching threshold, and an audio stream with a highest matching value may be selected as the successfully matched audio stream.

In addition, when the original voiceprint feature model is a feature model that is formed after a voiceprint registration process for a plurality of persons, for example, is established for audio stream training samples of the users B and C, and it is highly possible that audio streams obtained after the matching include both the audio stream B and the audio stream C, thereby implementing matching of a voiceprint feature model in a multi-person mode. In this case, the foregoing steps are separately executed for each person of the plurality of persons.

Step S206: Use the successfully matched audio stream as an additional audio stream training sample for generating the original voiceprint feature model, and update the original voiceprint feature model.

Step S206 includes: generating a corrected voiceprint feature model according to the successfully matched audio stream and the preset audio stream training sample, where the preset audio stream training sample is an audio stream for generating the original voiceprint feature model; and updating the original voiceprint feature model to the corrected voiceprint feature model.

Specifically, the successfully matched audio stream is used as the additional audio stream training sample. That is, the voiceprint registration algorithm interface is called to generate a corrected voiceprint feature model according to the successfully matched audio stream and the preset audio stream training sample, and, where the corrected voiceprint feature model is a more precise voiceprint feature model, thereby achieving a purpose of model adaptation and intelligence.

Further, the updated voiceprint feature model may also be used as the original voiceprint feature model, and the foregoing steps are repeated to continuously correct and update the voiceprint feature model, and continuously improve precision of the voiceprint feature model.

In this embodiment of the present invention, an original audio stream of a voice call is automatically used as a voiceprint training corpus, collected original audio stream is processed by using a speaker segmentation and clustering algorithm in a situation in which user experience is not affected or user operations are reduced, so as to ensure pureness of the voiceprint training corpus, and an additional matched audio stream is used to lengthen the training corpus, so as to dynamically correct the original voiceprint feature model. This dynamically corrects and updates the voiceprint feature model and improves precision of the voiceprint feature model. Therefore, a recognition rate can be further improved and user experience is also enhanced in a process such as voice recognition by using the voiceprint feature model.

A person of ordinary skill in the art may understand that, all or a part of the steps of the method in the foregoing embodiment may be implemented by a program instructing relevant hardware. The program may be stored in a computer readable storage medium, where the storage medium is, for example, an read-only memory (ROM)/random-access memory (RAM), a magnetic disk, or an optical disc.

Embodiment 3

Figure 4:
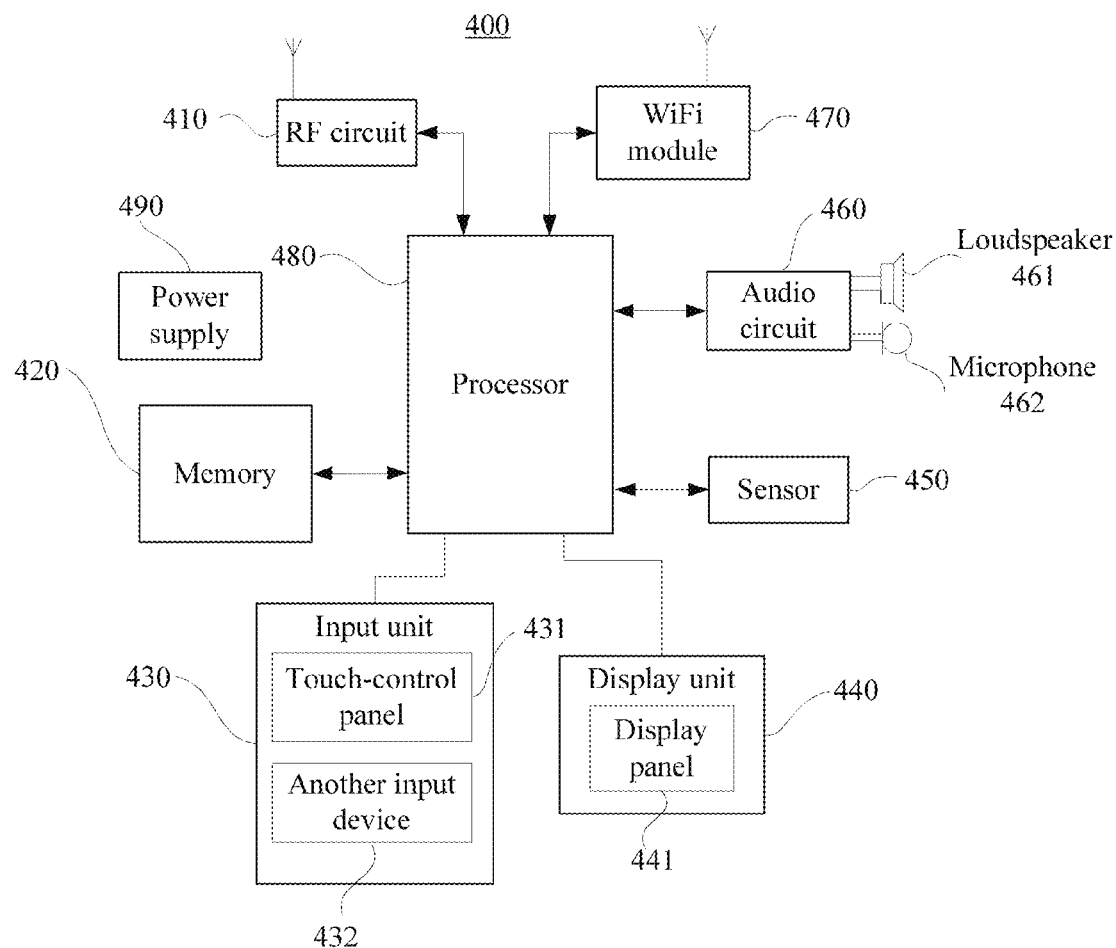
FIG. 4 is a structural diagram of a terminal according to Embodiment 3 of the present invention.

FIG. 4 shows a structure of a terminal according to Embodiment 3 of the present invention. The terminal provided in Embodiment 3 of the present invention may be configured to implement the methods of Embodiment 1 and Embodiment 2 of the present invention. For ease of description, only parts related to the embodiment of the present invention are shown. For specific technical details that are not disclosed, reference may be made to Embodiment 1 and Embodiment 2 of the present invention.

The terminal may be a terminal device such as a mobile phone, a tablet computer, a personal digital assistant (PDA), a point of sales (POS), or a vehicle-mounted computer. That the terminal is a mobile phone is used as an example. FIG. 4 shows a block diagram of a part of a structure of a mobile phone 400 related to the terminal provided by this embodiment of the present invention. Referring to FIG. 4, the mobile phone 400 includes parts such as a radio frequency (RF) circuit 410, a memory 420, an input unit 430, a display unit 440, a sensor 450, an audio circuit 460, a wireless fidelity (WiFi) module 470, a processor 480, and a power supply 490. A person skilled in the art can understand that, the structure of the mobile phone shown in FIG. 4 does not constitute a limitation on the mobile phone, and the mobile phone may include more or fewer parts than that shown in the figure, or combine some parts, or have different arrangement of the parts.

The following describes parts of the mobile phone 400 in detail with reference to FIG. 4.

The RF circuit 410 may be configured to receive or send information, or receive or send a signal during a call, and particularly, receive downlink information of a base station and send the information to the processor 480 for processing. In addition, the RF circuit 410 sends uplink data to the base station. Generally, the RF circuit includes, but is not limited to, at least one amplifier, a transceiver, a coupler, a low noise amplifier (LNA), a duplexer, and the like. In addition, the RF circuit 410 may also communicate with other devices by using wireless communication and a network. The wireless communication may use any one communications standard or protocol, and includes, but is not limited to, Global System of Mobile communication (GSM), General Packet Radio Service (GPRS), Code Division Multiple Access (CDMA), Wideband Code Division Multiple Access (WCDMA), Long Term Evolution (LTE), electronic mail (email), short messaging service (SMS), and the like.

The memory 420 may be configured to store a software program and a module. The processor 480 runs the software program and the module stored in the memory 420, to execute all types of function applications of the mobile phone 400 and process data. The memory 420 may mainly include a program storage area and a data storage area, where the program storage area may store an operating system, at least one application program required by a function (for example, a sound playing function and an image playing function), and the like; and the data storage area may store data (for example, audio data and a phone book), which is created according to usage of the mobile phone 400, and the like. In addition, the memory 420 may include a high-speed RAM, and may also include a non-volatile memory, for example, at least one magnetic disk memory, a flash memory, or other volatile solid-state memories.

The input unit 430 may be configured to receive digital or character information that is entered, and generate a key signal input related to user settings and function control of the mobile phone 400. Specifically, the input unit 430 may include a touch-control panel 431 and another input device 432. The touch-control panel 431, also referred to as a touchscreen, may collect touch operations of a user on or near the panel (for example, operations performed by the user on the touch-control panel 431 or near the touch-control panel 431 by using any suitable object or accessory such as a finger and a stylus), and drive a corresponding connection apparatus according to a preset program. Optionally, the touch-control panel 431 may include two parts, namely, a touch detection apparatus and a touch controller. The touch detection apparatus detects a touch position of the user, detects a signal brought by the touch operation, and transfers the signal to the touch controller. The touch controller receives touch information from the touch detection apparatus, converts the information into coordinates of a touch point, sends the coordinates to the processor 480, and can receive and run a command sent by the processor 480. In addition, the touch-control panel 431 may be implemented in a plurality of forms such as resistive, capacitive, infrared, and surface acoustic wave. In addition to the touch-control panel 431, the input unit 430 may also include another input device 432. Specifically, the another input device 432 may include, but be not limited to, one or more types of the following: a physical keyboard, a function key (such as a volume control key or an on/off botton), a trackball, a mouse, and a joystick.

The display unit 440 may be configured to display information entered by the user or information provided to the user, and menus of the mobile phone 400. The display unit 440 may include a display panel 441. Optionally, the display panel 441 may be configured in a form, such as a liquid crystal display (LCD) and an organic light-emitting diode (OLED). Further, the touch-control panel 431 may cover the display panel 441. After detecting a touch operation on or near the touch-control panel 431, the touch-control panel 431 transfers the operation to the processor 480 to determine a touch event type. Then, the processor 480 provides a corresponding visual output on the display panel 441 according to the touch event type. Although the touch-control panel 431 and the display panel 441 in FIG. 4 are two independent parts for implementing input and output functions of the mobile phone 400, the touch-control panel 431 and the display panel 441 may be integrated in some embodiments to implement the input and output functions of the mobile phone 400.

The mobile phone 400 may also include at least one type of sensor 450, for example, a light sensor, a motion sensor and other sensors. Specifically, the light sensor may include an ambient light sensor and a proximity sensor, where the ambient light sensor may adjust brightness of the display panel 441 according to intensity of ambient light, and the proximity sensor may turn off the display panel 441 and/or backlight when the mobile phone 400 moves to an ear. As one type of the motion sensor, an accelerometer sensor may detect accelerations in all directions (three axes generally), may detect a size and a direction of a gravity when the accelerometer sensor is stationary, and may be configured to recognize mobile phone posture applications (for example, switch between portrait and landscape orientations, related games, and magnetometer posture calibration), and vibration recognition related functions (such as a pedometer and knocking), and the like. Regarding other sensors, such as a gyroscope, a barometer, a hygrometer, a thermometer, and an infrared sensor, that can be configured for the mobile phone 400, details are not described herein again.

The audio circuit 460, a speaker 461, and a microphone 462 may provide audio interfaces between the user and the mobile phone 400. The audio circuit 460 may transmit an electrical signal converted from received audio data to the speaker 461, and the speaker 461 converts the electrical signal into a voice signal to be output. Further, the microphone 462 converts a collected sound signal into an electrical signal, the audio circuit 460 receives the electrical signal and converts the electrical signal into audio data, and outputs the audio data to the processor 480 for processing, and sends processed audio data to, for example, another mobile phone by using the RF circuit 410, or outputs the audio data to the memory 420 for further processing.

WiFi belongs to a short-range wireless transmission technology. The mobile phone 400 may help a user receive and send emails, browse a web page, and access streaming media by using the WiFi module 470. The WiFi module 470 provides the user with wireless broadband Internet access. Although the WiFi module 470 is shown in FIG. 4, it can be understood that the WiFi module 470 is not essential to the mobile phone 400, and absolutely may be omitted as required within a scope not changing an essence of the present invention.

The processor 480 is a control center of the mobile phone 400, connects all parts of the entire mobile phone by using all types of interfaces and circuits, and executes functions of the mobile phone 400 and processes data by running or executing the software program and/or module stored in the memory 420 and calling data stored in the memory 420, so as to monitor the mobile phone as a whole. Optionally, the processor 480 may include one or more processing units. Preferably, the processor 480 may be integrated with an application processor and a modem processor, where the application processor mainly processes an operating system, a user interface, an application program, and the like, and the modem processor mainly processes wireless communication. It can be understood that, the foregoing modem processor may not be integrated into the processor 480.

The mobile phone 400 further includes the power supply 490 (such as a battery) that supplies power to all parts. Preferably, the power supply may be logically connected to the processor 480 by using a power supply management system, and therefore functions of charging, discharging, and power consumption management are implemented by using the power supply management system.

Although not shown, the mobile phone 400 may also include a camera, a BLUETOOTH module, and the like, and details are not described herein again.

In this embodiment of the present invention, the microphone 462, the memory 420, and the processor 480 that are included by the terminal further have the following functions.

The microphone 462 is further configured to obtain an original audio stream including at least one speaker, and send the original audio stream to the memory 420 by using the audio circuit 460.

In this embodiment of the present invention, the original audio stream may be an audio stream generated by a user making a call or making a voice chat by using a mobile phone terminal, or may be an audio stream obtained by the microphone 462, for example, in a manner of recording a voice. Specifically, a possible situation is that, when a mobile phone terminal is in a call connected state, the user is asked whether to agree to use a voiceprint learning function, and an audio stream generated during a conversation is recorded if the user agrees; or a switch for automatically enabling the voiceprint learning function during a call is configured for the terminal, and the user sets the switch as required; or the voiceprint learning function is configured for the mobile phone terminal, and the user may record an audio stream. It should be noted that, because usually a plurality of persons may join a conversation in turn during a phone call or a chat, the original audio stream obtained in this case may include audio data of the plurality of persons.

The processor 480 is further configured to invoke the original audio stream stored in the memory, call a preset speaker segmentation and clustering algorithm in the memory 420, obtain a respective audio stream of each speaker of the at least one speaker in the original audio stream, separately match the respective audio stream of each speaker of the at least one speaker with an original voiceprint feature model, to obtain a successfully matched audio stream, use the successfully matched audio stream as an additional audio stream training sample for generating the original voiceprint feature model, and update the original voiceprint feature model.

In this embodiment of the present invention, because the original audio stream includes the audio stream of at least one speaker, the processor 480 needs to call the preset speaker segmentation algorithm in the memory 420, and segment the original audio stream into a plurality of audio clips, where each audio clip of the plurality of audio clips includes only audio information of a same speaker of the at least one speaker. Then, the processor 480 clusters, according to a preset speaker clustering algorithm, the audio clips that include only the same speaker of the at least one speaker to finally generate an audio stream that includes only the audio information of the same speaker of the at least one speaker. Further, the processor 480 may acquire a matching degree obtained by separately matching the respective audio stream of each speaker of the at least one speaker with the original voiceprint feature model with reference to the respective audio stream of each person and the original voiceprint feature model, and may use an audio stream with a matching degree that is greater than a preset matching threshold and is the highest as the successfully matched audio stream, so as to use the successfully matched audio stream as the additional audio stream training sample for generating the original voiceprint feature model; and call a voiceprint registration algorithm interface and update the original voiceprint feature model, so as to obtain a more precise voiceprint feature model.

This embodiment of the present invention provides a terminal including a microphone 462, a memory 420, a processor 480, and so on. The microphone 462 obtains an original audio stream of at least one speaker, and sends the original audio stream to the memory 420 through an audio circuit 460. The processor 480 receives the original audio stream that is sent by the microphone 462 through the audio circuit 460, calls a preset speaker segmentation and clustering algorithm in the memory 420, obtains a respective audio stream of each speaker of the at least one speaker in the original audio stream, obtains an audio stream matching an original voiceprint feature model, uses the matched audio stream as an additional audio stream training sample for generating the original voiceprint feature model, and updates the original voiceprint feature model. This ensures dynamic correction and update for the voiceprint feature model under a premise of relatively high practicability and improves precision of the voiceprint feature model.

Embodiment 4

Figure 5:
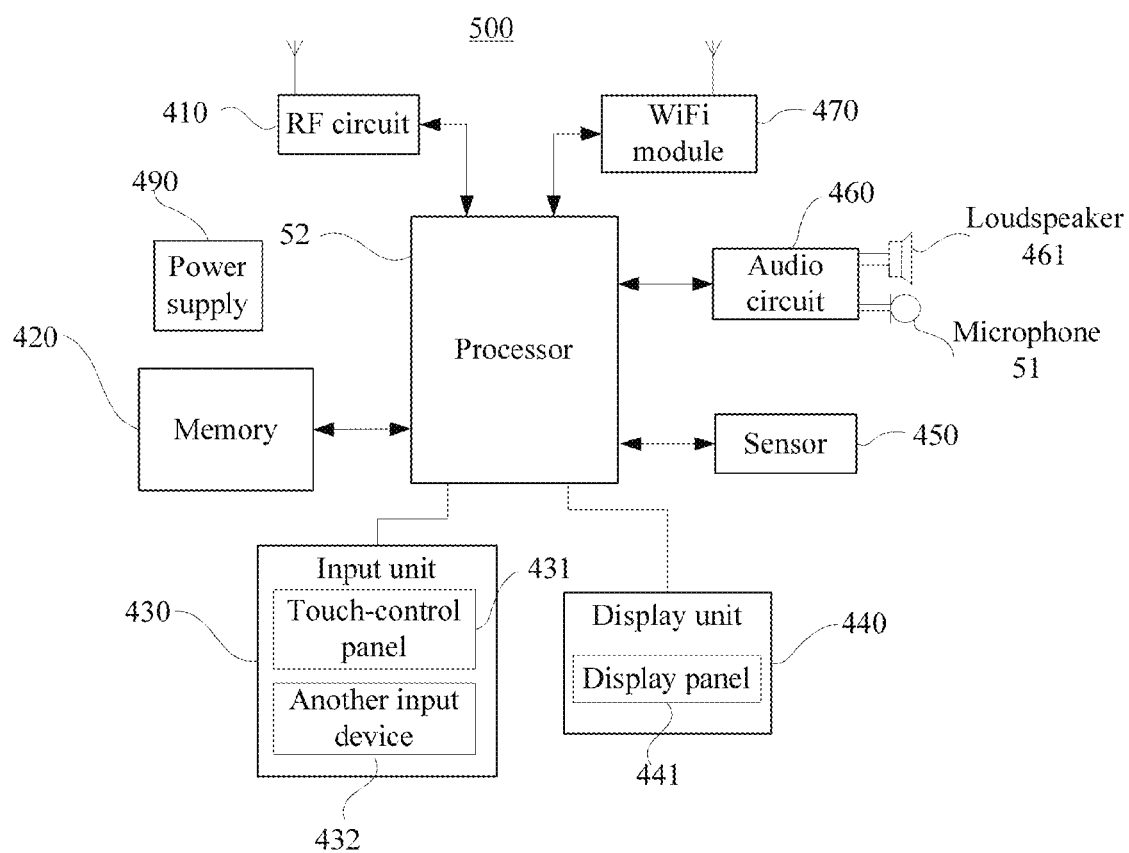
FIG. 5 is a structural diagram of a terminal according to Embodiment 4 of the present invention.

FIG. 5 shows a structure of a terminal according to Embodiment 4 of the present invention. For ease of description, only parts related to this embodiment of the present invention are shown. The terminal provided in Embodiment 4 of the present invention may be configured to implement the methods of Embodiment 1 and Embodiment 2 of the present invention. For ease of description, only parts related to the embodiment of the present invention are shown. For specific technical details that are not disclosed, reference may be made to Embodiment 1 and Embodiment 2 of the present invention.

Specifically, FIG. 5 shows a block diagram of a part of a structure of a mobile phone 500 related to the terminal provided by this embodiment of the present invention. On a basis of the structure shown in FIG. 4, a microphone 51 and a processor 52 are used in this embodiment of the present invention to replace the microphone 462 and the processor 480, respectively, shown in FIG. 4.

In addition to the functions included by the microphone 462 in Embodiment 3, the microphone 51 is further configured to obtain a preset audio stream training sample, and send the audio stream training sample to the memory 420 by using the audio circuit 460, so that the processor 52 calls a preset voiceprint registration algorithm interface in the memory, and establishes an original voiceprint feature model according to the preset audio stream training sample.

In this embodiment of the present invention, the original voiceprint feature model is a voiceprint feature model established according to the preset audio stream training sample by calling the voiceprint registration algorithm interface. The original voiceprint feature model is a feature model that is formed after a voiceprint registration process for a person or a plurality of persons, and the registration process has no requirement on a length of a training corpus, which is also referred to as an audio stream training sample. In addition, because a method provided by an embodiment of the present invention may implement continuous and dynamic correction for the corrected model, the original voiceprint feature model may be a model obtained by using an existing method, and may also be a model corrected by using the method provided by the embodiment of the present invention.

In this case, the processor 52 is further configured to, according to an original audio stream when at least one speaker is speaking that is received by the microphone 51, segment the original audio stream into a plurality of audio clips by calling a preset speaker segmentation algorithm in the memory 420, where each audio clip of the plurality of audio clips includes only audio information of a same speaker of the at least one speaker, and then cluster the audio clips that include only the same speaker of the at least one speaker by calling a preset speaker clustering algorithm in the memory 420, to generate an audio stream that includes only the audio information of the same speaker of the at least one speaker.

Further, the processor 52 is further configured to obtain a matching degree between the audio stream of each speaker of the at least one speaker and the original voiceprint feature model according to the audio stream of each speaker of the at least one speaker and the original voiceprint feature model, select an audio stream corresponding to a matching degree that is the highest and is greater than a preset matching threshold as a successfully matched audio stream, generate a corrected voiceprint feature model according to the successfully matched audio stream and the preset audio stream training sample, and update the original voiceprint feature model to the corrected voiceprint feature model.

In this embodiment of the present invention, the microphone 51 can obtain a preset audio stream training sample, where the preset audio stream training sample is an original audio stream required for establishing the original voiceprint feature model. The microphone 51 can also obtain an original audio stream of at least one speaker. The processor 52 may successively call a preset voiceprint registration algorithm interface, a speaker segmentation algorithm, and a preset speaker clustering algorithm in the memory 420, to generate an audio stream that includes only the audio information of the same speaker of the at least one speaker, and finally may obtain a successfully matched audio stream; generate a corrected voiceprint feature model with reference to the successfully matched audio stream and the preset audio stream training sample, and update the original voiceprint feature model to the corrected voiceprint feature model. Therefore, the corrected voiceprint feature model is used to significantly improve audio stream recognition accuracy compared with the original voiceprint feature model, and user experience is further improved.

Embodiment 5

Figure 6:
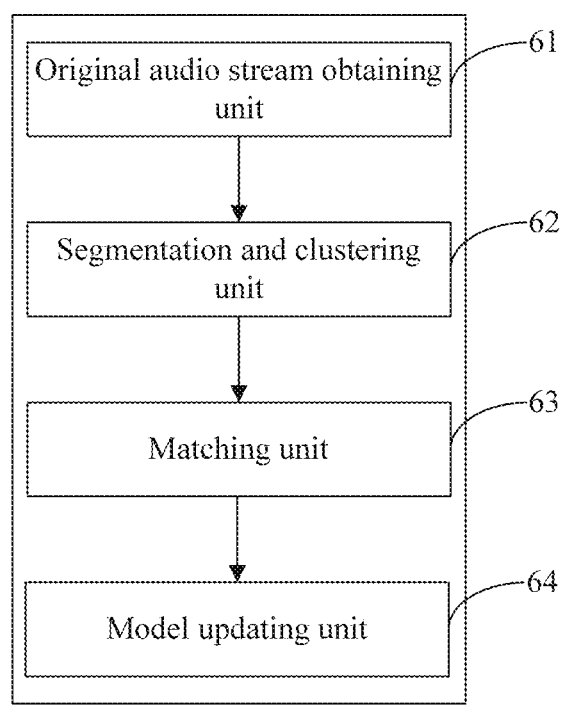
FIG. 6 is a structural diagram of a terminal according to Embodiment 5 of the present invention.

FIG. 6 shows a structure of a terminal according to Embodiment 5 of the present invention. For ease of description, only parts related to this embodiment of the present invention are shown. The terminal provided in Embodiment 5 of the present invention may be configured to implement the methods of Embodiment 1 and Embodiment 2 of the present invention. For ease of description, only parts related to this embodiment of the present invention are shown. For specific technical details that are not disclosed, reference may be made to Embodiment 1 and Embodiment 2 of the present invention.

The terminal includes an original audio stream obtaining unit 61, a segmentation and clustering unit 62, a matching unit 63, and a model updating unit 64. The original audio stream obtaining unit 61 is in one-to-one correspondence with the functions included by the microphone 41 in Embodiment 3, and the segmentation and clustering unit 62, the matching unit 63 and the model updating unit 64 are in one-to-one correspondence with the functions included by the processor 42 in Embodiment 3, where the original audio stream obtaining unit 61 is configured to obtain an original audio stream including at least one speaker, and send the original audio stream to the segmentation and clustering unit 62; the segmentation and clustering unit 62 is configured to receive the original audio stream sent by the original audio stream obtaining unit 61, obtain a respective audio stream of each speaker of the at least one speaker in the original audio stream according to a preset speaker segmentation and clustering algorithm, and send the respective audio stream of each speaker of the at least one speaker to the matching unit 63; the matching unit 63 is configured to receive the respective audio stream of each speaker of the at least one speaker sent by the segmentation and clustering unit 62, separately match the respective audio stream of each speaker of the at least one speaker with an original voiceprint feature model, to obtain a successfully matched audio stream, and send the successfully matched audio stream to the model updating unit 64; and the model updating unit 64 is configured to receive the successfully matched audio stream sent by the matching unit 63, use the successfully matched audio stream as an additional audio stream training sample for generating the original voiceprint feature model, and update the original voiceprint feature model.

In this embodiment of the present invention, after entering a call listening state, the original audio stream obtaining unit 61 can obtain an audio stream by listening, where the audio stream may be generated by using a voice recorder or voice chat software.

In this embodiment of the present invention, the segmentation and clustering unit 62 can segment the original audio stream into several audio clips, where each audio clip includes only audio information of one speaker, cluster the audio clips of the same speaker again, to generate an audio stream of each person, and finally segment the original audio stream into audio streams representing different speakers, that is, generate an audio stream of audio information of a same speaker in all speakers. The matching unit 63 traverses all the audio streams, and obtains a matching degree between each audio stream and the original voiceprint feature model with reference to the original voiceprint feature model. Specifically, the matching unit 63 separately uses each audio stream as an input value of the original voiceprint feature model to obtain a probability, or referred to as a matching degree, corresponding to each audio stream, and obtains one or more audio streams matching the original voiceprint feature model. In an actual operation process, an audio stream corresponding to a matching degree that is the highest and is greater than a preset matching threshold may be selected as a successfully matched audio stream, to ensure that the obtained audio stream is highly related to the original voiceprint feature model, so that the audio stream used as a voiceprint training corpus is pure. The model updating unit 64 uses the successfully matched audio stream as an additional audio stream training sample for generating the original voiceprint feature model, then performs voiceprint registration and generates a new voiceprint feature model, or referred to as a corrected voiceprint feature model, and updates the original voiceprint feature model to the corrected voiceprint feature model. Finally, when the voiceprint feature model is obtained, it is ensured that a purpose of improving precision of the voiceprint feature model is achieved under a premise of relatively high practicability.

Embodiment 6

Figure 7:
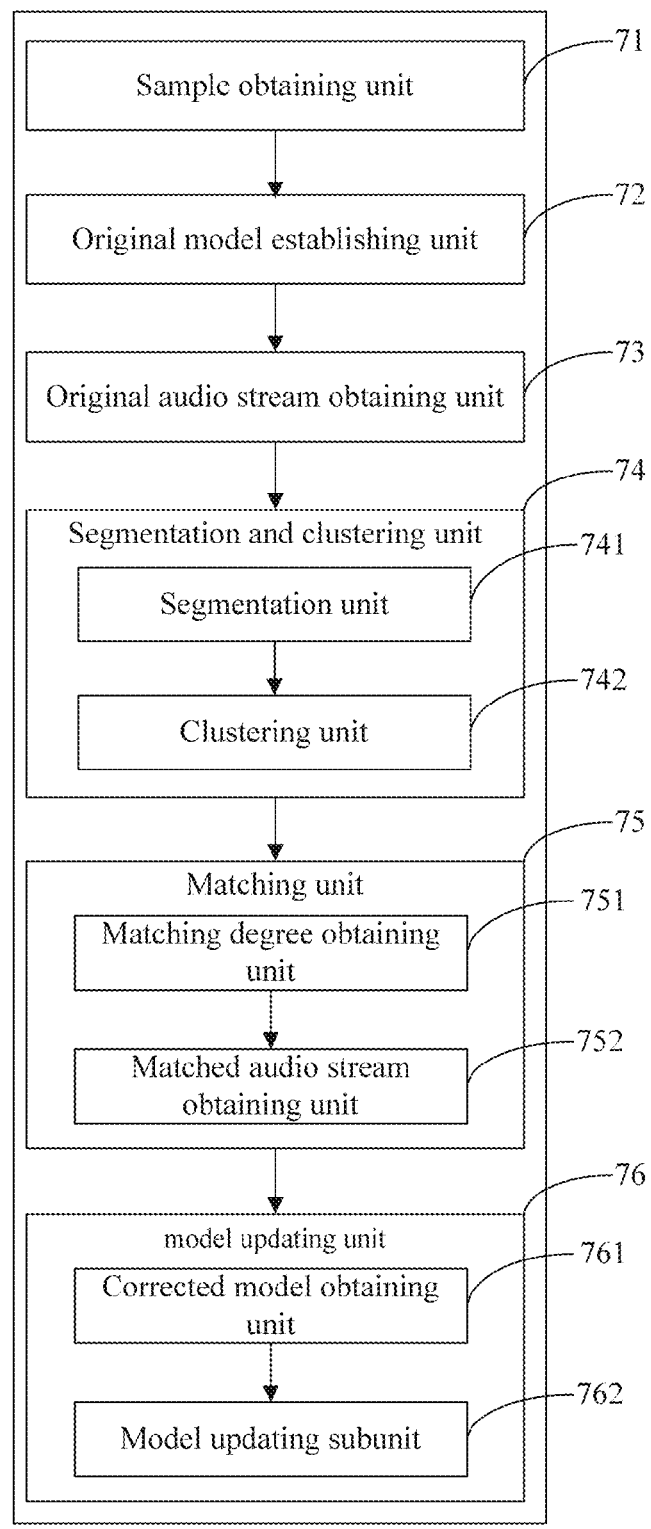
FIG. 7 is a structural diagram of a terminal according to Embodiment 6 of the present invention.

FIG. 7 shows a structure of a terminal according to Embodiment 6 of the present invention. For ease of description, only parts related to this embodiment of the present invention are shown. The terminal provided in Embodiment 6 of the present invention may be configured to implement the methods of Embodiment 1 and Embodiment 2 of the present invention. For ease of description, only parts related to this embodiment of the present invention are shown. For specific technical details that are not disclosed, reference may be made to Embodiment 1 and Embodiment 2 of the present invention.

The terminal includes a sample obtaining unit 71, an original model establishing unit 72, an original audio stream obtaining unit 73, a segmentation and clustering unit 74, a matching unit 75, a model updating unit 76, and the original audio stream obtaining unit 73, the segmentation and clustering unit 74, the matching unit 75, and the model updating unit 76 are in one-to-one correspondence with the functions of the original audio stream obtaining unit 61, the segmentation and clustering unit 62, the matching unit 63, and the model updating unit 64, respectively, in Embodiment 5, and details are not described herein again.

The sample obtaining unit 71 is configured to obtain a preset audio stream training sample and send it to the original model establishing unit 72.

The original model establishing unit 72 is configured to establish an original voiceprint feature model according to the preset audio stream training sample.

The original voiceprint feature model is a voiceprint feature model established, according to the preset audio stream training sample sent by the sample obtaining unit 71, by the original model establishing unit 72 by calling a voiceprint registration algorithm interface. The original voiceprint feature model is a feature model that is formed after a voiceprint registration process for a person or a plurality of persons, and the registration process has no requirement on a length of a training corpus, which is also referred to as an audio stream training sample. In addition, because a method provided by an embodiment of the present invention may implement continuous and dynamic correction for the corrected model, the original voiceprint feature model may be a model obtained by using an existing method, and may also be a model corrected by using the method provided by the embodiment of the present invention.

In this embodiment of the present invention, after entering a call listening state, the original audio stream obtaining unit 73 can obtain an audio stream by listening, where the audio stream may be generated by using a voice recorder or voice chat software. That the terminal is a smartphone is used as an example. When the smartphone is in a call connected state, the user is asked whether to agree to use a voiceprint learning function, and after the user agrees, an audio stream of a user joining a call and the other party of the call can be recorded; or a switch for automatically enabling the voiceprint learning function during a call is configured for the terminal, and the user sets the switch as required; or the voiceprint learning function is configured for the terminal, and the user may record an audio stream. It should be noted that, because a plurality of persons may join a conversation in turn during a phone call or a chat, the original audio stream obtained in this case may include audio data of the plurality of persons. The original audio stream obtained by the original audio stream obtaining unit 73 can cover audio data of various intonations, speaking speeds, and emotions of the speakers, and reduce an effect of the factors of intonation, speaking speed, and emotion on model accuracy. Further, the user does not need to deliberately input audio streams with the number of times and a duration during a process of obtaining the audio stream, thereby reducing complexity of a user operation, ensuring practicability in the obtaining process, and also improving user experience.

As shown in FIG. 7, the segmentation and clustering unit 74 includes a segmentation unit 741 and a clustering unit 742, where the segmentation unit 741 is configured to segment the original audio stream into a plurality of audio clips according to a preset speaker segmentation algorithm, where each audio clip of the plurality of audio clips includes only audio information of a same speaker of the at least one speaker, and send the audio clips that include only the same speaker of the at least one speaker to the clustering unit 742; and the clustering unit 742 is configured to receive the audio clips, sent by the segmentation unit 741, that include only the same speaker of the at least one speaker, and cluster, according to a preset speaker clustering algorithm, the audio clips that include only the same speaker of the at least one speaker, to generate an audio stream that includes only the audio information of the same speaker of the at least one speaker.

In this embodiment of the present invention, the segmentation unit 741 can segment the original audio stream into several audio clips, where each audio clip includes only audio information of one speaker, and the clustering unit 742 clusters the audio clips of the same speaker again, to generate an audio stream of each person. Finally, the original audio stream is segmented into audio streams representing different speakers.

As shown in FIG. 7, the matching unit 75 includes a matching degree obtaining unit 751 and a matched audio stream obtaining unit 752, where the matching degree obtaining unit 751 is configured to obtain a matching degree between the audio stream of each speaker of the at least one speaker and the original voiceprint feature model according to the audio stream of each speaker of the at least one speaker and the original voiceprint feature model, and send the matching degree to the matched audio stream obtaining unit 752; and the matched audio stream obtaining unit 752 is configured to receive the matching degree, sent by the matching degree obtaining unit 751, between the audio stream of each speaker of the at least one speaker and the original voiceprint feature model, and select an audio stream corresponding to a matching degree that is the highest and is greater than a preset matching threshold as a successfully matched audio stream.

In this embodiment of the present invention, the matching degree obtaining unit 751 traverses all the audio streams, obtains a matching degree between the audio stream of each speaker of the at least one speaker and the original voiceprint feature model according to the audio stream of each speaker of the at least one speaker and the original voiceprint feature model. Specifically, the matching degree obtaining unit 751 separately uses each audio stream as an input value of the original voiceprint feature model to obtain a matching value corresponding to each audio stream, where the matching value may be obtained by calling a voiceprint verification algorithm interface. Then, the matched audio stream obtaining unit 752 obtains one or more audio streams matching the original voiceprint feature model, and may select an audio stream corresponding to a matching degree that is the highest and is greater than a preset matching threshold as the successfully matched audio stream, so as to ensure that the obtained audio stream is highly related to the original voiceprint feature model, so that the audio stream used as a voiceprint training corpus is pure.

As shown in FIG. 7, the model updating unit 76 includes a corrected model obtaining unit 761 and a model updating subunit 762, where the corrected model obtaining unit 761 is configured to generate a corrected voiceprint feature model according to the successfully matched audio stream and the preset audio stream training sample, and send the corrected voiceprint feature model to the model updating subunit 762; and the model updating subunit 762 is configured to receive the corrected voiceprint feature model sent by the corrected model obtaining unit 761, and update the original voiceprint feature model to the corrected voiceprint feature model.

In this embodiment of the present invention, the successfully matched audio stream is used as the additional audio stream training sample for generating the original voiceprint feature model. That is, with reference to the audio stream training sample used for generating the original voiceprint feature model and the successfully matched audio stream, the corrected model obtaining unit 761 is used to perform voiceprint registration and generate a new voiceprint feature model, or referred to as a corrected voiceprint feature model. The model updating subunit 762 updates the original voiceprint feature model to the corrected voiceprint feature model.

This embodiment of the present invention provides a terminal including a sample obtaining unit 71, an original model establishing unit 72, an original audio stream obtaining unit 73, a segmentation and clustering unit 74, a matching unit 75, and a model updating unit 76. Original audio stream information of a speaker is obtained by listening and used as a voiceprint training corpus, and the original audio stream information is processed by using a preset speaker segmentation and clustering algorithm, so as to obtain an additional audio stream training sample, so that correction and update operations are performed for an original voiceprint feature model according to the additional audio stream training sample, thereby improving precision of the voiceprint feature model under a premise of relatively high practicability. Therefore, voiceprint recognition accuracy is significantly improved when the corrected original voiceprint feature model is applied to a voiceprint unblocking solution of a terminal. Further, if the original voiceprint feature model is established for a speech audio stream training sample of a plurality of persons, the updated original voiceprint feature model can accurately recognize audio information of the plurality of persons to perform unlock and the like, so that an unlock process is more intelligent.

In a method for updating a voiceprint feature model provided by the embodiments of the present invention, an original audio stream including at least one speaker is obtained, a respective audio stream of each speaker of the at least one speaker in the original audio stream is obtained according to a preset speaker segmentation and clustering algorithm, the respective audio stream of each speaker of the at least one speaker is separately matched with an original voiceprint feature model, to obtain a successfully matched audio stream, the successfully matched audio stream is used as an additional audio stream training sample for generating the original voiceprint feature model, and the original voiceprint feature model is updated. This solves a problem that when a voiceprint feature model is obtained by using an existing method, it cannot be ensured that precision of the voiceprint feature model is improved under a premise of relatively high practicability, and as a result, recognition accuracy cannot be improved by using the voiceprint feature model. This improves the precision of the voiceprint feature model and the recognition accuracy under a premise that user experience is not affected and relatively high practicability is ensured.

It should be noted that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

In combination with the embodiments disclosed in this specification, method or algorithm steps may be implemented by hardware, a software module executed by a processor, or a combination thereof. The software module may reside in a RAM, a memory, a ROM, an electrically programmable ROM, an electrically erasable programmable ROM, a register, a hard disk, a removable disk, a compact disc read-only memory (CD-ROM), or any other form of storage medium known in the art.

The foregoing specific embodiments clarify the objective, technical solutions, and benefits of the present invention in detail. It should be understood that the foregoing descriptions are merely specific embodiments of the present invention, but are not intended to limit the protection scope of the present invention. Any modification, equivalent replacement, or improvement made without departing from the spirit and principle of the present invention should fall within the protection scope of the present invention.

What is claimed is:

1. A method for updating a voiceprint feature model, comprising:
    obtaining an original audio stream comprising at least one speaker;
    obtaining a respective audio stream of each speaker of the at least one speaker in the original audio stream according to a preset speaker segmentation and clustering algorithm;
    separately matching the respective audio stream of each speaker of the at least one speaker with an original voiceprint feature model to obtain a successfully matched audio stream;
    using the successfully matched audio stream as an additional audio stream training sample for generating the original voiceprint feature model; and
    updating the original voiceprint feature model to improve a voice recognition capability of a computing device that uses the original voiceprint feature model to identify the at least one speaker.

2. The method according to claim 1, wherein before obtaining the original audio stream comprising the at least one speaker, the method further comprises establishing the original voiceprint feature model according to a preset audio stream training sample.

3. The method according to claim 2, wherein obtaining the respective audio stream of each speaker of the at least one speaker in the original audio stream according to the preset speaker segmentation and clustering algorithm comprises:
    segmenting the original audio stream into a plurality of audio clips according to a preset speaker segmentation algorithm, wherein each audio clip of the plurality of audio clips comprises only audio information of a same speaker of the at least one speaker; and
    clustering, according to a preset speaker clustering algorithm, the audio clips that comprise only the same speaker of the at least one speaker, to generate an audio stream that comprises only the audio information of the same speaker of the at least one speaker.

4. The method according to claim 3, wherein separately matching the respective audio stream of each speaker of the at least one speaker with the original voiceprint feature model to obtain the successfully matched audio stream comprises:
    obtaining a matching degree between the audio stream of each speaker of the at least one speaker and the original voiceprint feature model according to the audio stream of each speaker of the at least one speaker and the original voiceprint feature model; and
    selecting an audio stream corresponding to a matching degree that is the highest and is greater than a preset matching threshold as the successfully matched audio stream.

5. The method according to claim 2, wherein separately matching the respective audio stream of each speaker of the at least one speaker with the original voiceprint feature model to obtain the successfully matched audio stream comprises:
    obtaining a matching degree between the audio stream of each speaker of the at least one speaker and the original voiceprint feature model according to the audio stream of each speaker of the at least one speaker and the original voiceprint feature model; and
    selecting an audio stream corresponding to a matching degree that is the highest and is greater than a preset matching threshold as the successfully matched audio stream.

6. The method according to claim 1, wherein obtaining the respective audio stream of each speaker of the at least one speaker in the original audio stream according to the preset speaker segmentation and clustering algorithm comprises:
    segmenting the original audio stream into a plurality of audio clips according to a preset speaker segmentation algorithm, wherein each audio clip of the plurality of audio clips comprises only audio information of a same speaker of the at least one speaker; and
    clustering, according to a preset speaker clustering algorithm, the audio clips that comprise only the same speaker of the at least one speaker to generate an audio stream that comprises only the audio information of the same speaker of the at least one speaker.

7. The method according to claim 6, wherein separately matching the respective audio stream of each speaker of the at least one speaker with the original voiceprint feature model to obtain the successfully matched audio stream comprises:

obtaining a matching degree between the audio stream of each speaker of the at least one speaker and the original voiceprint feature model according to the audio stream of each speaker of the at least one speaker and the original voiceprint feature model; and selecting an audio stream corresponding to a matching degree that is the highest and is greater than a preset matching threshold as the successfully matched audio stream.

8. The method according to claim 1, wherein separately matching the respective audio stream of each speaker of the at least one speaker with the original voiceprint feature model to obtain a successfully matched audio stream comprises:

obtaining a matching degree between the audio stream of each speaker of the at least one speaker and the original voiceprint feature model according to the audio stream of each speaker of the at least one speaker and the original voiceprint feature model; and selecting an audio stream corresponding to a matching degree that is the highest and is greater than a preset matching threshold as the successfully matched audio stream.

9. The method according to claim 1, wherein using the successfully matched audio stream as the additional audio stream training sample for generating the original voiceprint feature model and updating the original voiceprint feature model comprises:

generating a corrected voiceprint feature model according to the successfully matched audio stream and the preset audio stream training sample, wherein the preset audio stream training sample is an audio stream for generating the original voiceprint feature model; and updating the original voiceprint feature model to the corrected voiceprint feature model.

10. The method according to claim 1, further comprising unlocking a screen of a mobile phone based upon matching the original voiceprint feature model.

11. A terminal, comprising:

a non-transitory computer readable medium having instructions stored thereon; and a computer processor coupled to the non-transitory computer readable medium and configured to execute the instructions to:

obtain an original audio stream comprising at least one speaker;

obtain a respective audio stream of each speaker of the at least one speaker in the original audio stream according to a preset speaker segmentation and clustering algorithm;

separately match the respective audio stream of each speaker of the at least one speaker with an original voiceprint feature model, to obtain a successfully matched audio stream;

use the successfully matched audio stream as an additional audio stream training sample for generating the original voiceprint feature model; and update the original voiceprint feature model to improve a voice recognition capability of a computing device that uses the original voiceprint feature model to identify the at least one speaker.

12. The terminal according to claim 11, wherein the computer processor is further configured to execute the instructions to:

obtain a preset audio stream training sample; and
establish the original voiceprint feature model according to the preset audio stream training sample.

13. The terminal according to claim 12, wherein the computer processor is further configured to execute the instructions to:

segment the original audio stream into a plurality of audio clips according to a preset speaker segmentation algorithm, wherein each audio clip of the plurality of audio clips comprises only audio information of a same speaker of the at least one speaker; and cluster, according to a preset speaker clustering algorithm, the audio clips that comprise only the same speaker of the at least one speaker, to generate an audio stream that comprises only the audio information of the same speaker of the at least one speaker.

14. The terminal according to claim 13, wherein the computer processor is further configured to execute the instructions to:

obtain a matching degree between the audio stream of each speaker of the at least one speaker and the original voiceprint feature model according to the audio stream of each speaker of the at least one speaker and the original voiceprint feature model; and select an audio stream corresponding to a matching degree that is the highest and is greater than a preset matching threshold as the successfully matched audio stream.

15. The terminal according to claim 11, wherein the computer processor is further configured to execute the instructions to:

segment the original audio stream into a plurality of audio clips according to a preset speaker segmentation algorithm, wherein each audio clip of the plurality of audio clips comprises only audio information of a same speaker of the at least one speaker; and cluster, according to a preset speaker clustering algorithm, the audio clips that comprise only the same speaker of the at least one speaker to generate an audio stream that comprises only the audio information of the same speaker of the at least one speaker.

16. The terminal according to claim 15, wherein the computer processor is further configured to execute the instructions to:

obtain a matching degree between the audio stream of each speaker of the at feast one speaker and the original voiceprint feature model according to the audio stream of each speaker of the at least one speaker and the original voiceprint feature model; and select an audio stream corresponding to a matching degree that is the highest and is greater than a preset matching threshold as the successfully matched audio stream.

17. The terminal according to claim 11, wherein the computer processor is further configured to execute the instructions to:

obtain a matching degree between the audio stream of each speaker of the at least one speaker and the original voiceprint feature model according to the audio stream of each speaker of the at least one speaker and the original voiceprint feature model; and select an audio stream corresponding to a matching degree that is the highest and is greater than a preset matching threshold as the successfully matched audio stream.

18. The terminal according to claim 12, wherein the computer processor is further configured to execute the instructions to:

obtain a matching degree between the audio stream of each speaker of the at least one speaker and the original voiceprint feature model according to the audio stream of each speaker of the at least one speaker and the original voiceprint feature model; and select an audio stream corresponding to a matching degree that is the highest and is greater than a preset matching threshold as the successfully matched audio stream.

19. The terminal according to claim 11, wherein the computer processor is further configured to execute the instructions to:

generate a corrected voiceprint feature model according to the successfully matched audio stream and the preset audio stream training sample; and update the original voiceprint feature model to the corrected voiceprint feature model.

20. The terminal according to claim 11, wherein the computer processor is further configured to execute the instructions to unlock a screen of a mobile phone based upon matching the original voiceprint feature model.

* * * * *